(12) United States Patent
Sannomiya et al.

(10) Patent No.: US 12,360,317 B2
(45) Date of Patent: Jul. 15, 2025

(54) LIGHT GUIDE MEMBER AND ELECTRONIC EQUIPMENT

(71) Applicant: Sony Interactive Entertainment Inc., Tokyo (JP)

(72) Inventors: Ryu Sannomiya, Tokyo (JP); Takeshi Igarashi, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 310 days.

(21) Appl. No.: 18/187,199

(22) Filed: Mar. 21, 2023

(65) Prior Publication Data

US 2023/0305229 A1 Sep. 28, 2023

Related U.S. Application Data

(60) Provisional application No. 63/323,215, filed on Mar. 24, 2022.

(51) Int. Cl.
*G02B 6/125* (2006.01)
*G02B 6/122* (2006.01)

(52) U.S. Cl.
CPC ........... *G02B 6/125* (2013.01); *G02B 6/1228* (2013.01)

(58) Field of Classification Search
CPC .... G02B 6/002; G02B 6/0045; G02B 6/1228; G02B 6/125
See application file for complete search history.

(56) References Cited

U.S. PATENT DOCUMENTS

2023/0126086 A1\* 4/2023 Suzuki .................... A63F 13/24
362/355

FOREIGN PATENT DOCUMENTS

WO 2021200076 A1 10/2021

\* cited by examiner

*Primary Examiner* — Michael P Mooney
(74) *Attorney, Agent, or Firm* — Kilpatrick Townsend & Stockton LLP

(57) ABSTRACT

Provided is a light guide member including a light-receiving section having a light-receiving surface for receiving light of a light-emitting component, a first light guide section extending in a first extension direction from the light-receiving section, two second light guide sections branching out from the first light guide section, and two light radiation surfaces for externally emitting light guided by the two second light guide sections. The first light guide section has a first width in a first width direction that is orthogonal to the first extension direction. The first width gradually decreases as it approaches a branch point between the two second light guide sections.

15 Claims, 8 Drawing Sheets

FIG.3
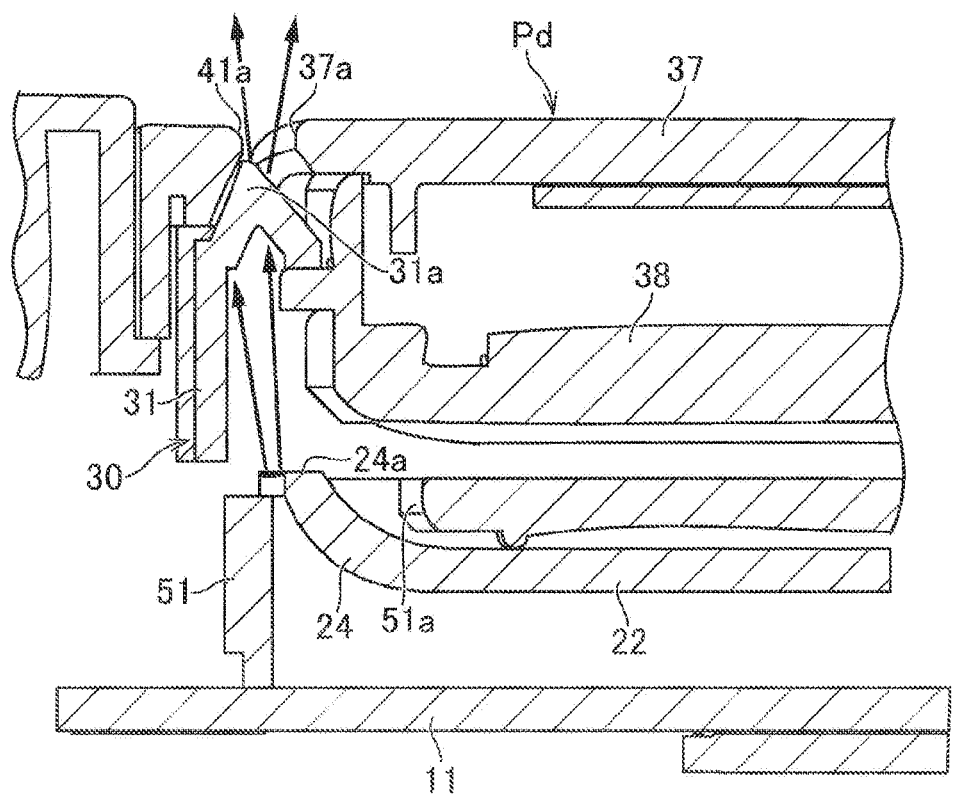
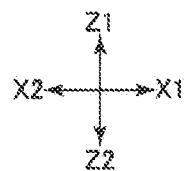

LIGHT GUIDE MEMBER AND ELECTRONIC EQUIPMENT

CROSS REFERENCE TO RELATED APPLICATIONS

This application claims the benefit of U.S. Provisional Patent Application No. 63/323,215, filed Mar. 24, 2022, the entire disclosure of which is hereby incorporated by reference.

BACKGROUND

The present disclosure relates to a light guide member and electronic equipment having a light-emitting component.

Among input devices for information processing apparatuses such as gaming apparatuses, some have light-emitting regions on external surfaces thereof. The light-emitting regions are used to present a status of a game being executed by the information processing apparatus and conditions of the input device. Such an input device has, therein, a light-emitting component (in general, a light-emitting diode) and a light guide member for guiding light of a light source to the light-emitting region provided on the external surface of the input device. An example of such an input device is disclosed in PCT Patent Publication No. WO2021/200076. Such a structure is not limited to input devices and is used, for example, for various pieces of electronic equipment such as gaming apparatuses themselves and audiovisual apparatuses.

SUMMARY

In order to change a color of light emitted from a light-emitting region to suit information (e.g., game status) presented to a user, a light-emitting component having a plurality of light-emitting elements is used. Specifically, there is a case where an element for emitting red light, an element for emitting blue light, and an element for emitting green light are used. Color unevenness occurs in the light-emitting region if light emitted from these three elements does not pass through a light guide member and reach the light-emitting region in a well-balanced manner. For example, despite a desire to cause the light-emitting region as a whole to light up white, there is a possibility that blue may become more intense in one part of the light-emitting region and that red may become more intense in other parts of the light-emitting region.

A first example of a light guide member proposed in the present disclosure includes a light-receiving section having a light-receiving surface for receiving light of a light-emitting component, a first light guide section extending in a first extension direction from the light-receiving section, two second light guide sections branching out from the first light guide section, and two light radiation surfaces for externally emitting light guided by the two second light guide sections. The first light guide section has a first width in a first width direction that is orthogonal to the first extension direction. The first width gradually decreases as it approaches a branch point between the two second light guide sections. According to this light guide member, it is possible to increase the number of times that light is reflected by an external surface of the first light guide section. As a result, light paths for light of a plurality of colors are diversified, which makes it possible to reduce color unevenness in the light radiation surfaces. Also, the light paths can be diversified in the first light guide section that is located upstream of the branch point between the two second light guide sections. Accordingly, it is possible to eliminate or reduce structures for reducing color unevenness in the second light guide sections, which makes it possible to increase a degree of freedom in shape of the second light guide sections.

A first example of electronic equipment proposed in the present disclosure includes the light guide member described in (1) and the light-emitting component. Further, the light-emitting component has a plurality of light-emitting elements each of which emits a plurality of colors.

A second example of the light guide member proposed in the present disclosure includes a light-receiving section having a light-receiving surface for receiving light of a light-emitting component, a first light guide section extending in a first extension direction from the light-receiving section, a second light guide section extending in a second extension direction from the first light guide section, and a light radiation surface for externally emitting light guided by the second light guide section. The first light guide section has a first width in a first width direction that is orthogonal to the first extension direction and a second width in a second width direction that is orthogonal to the first extension direction and the first width direction. The first width and the second width gradually decrease as they approach the second light guide section. According to this light guide member, it is possible to increase the number of times that light is reflected by an external surface of the first light guide section. As a result, light paths for light of a plurality of colors are diversified, which makes it possible to reduce color unevenness in the light radiation surface. Also, it is possible to diversify the light paths in the first light guide section, which makes it possible to eliminate or reduce structures for reducing color unevenness in the second light guide section and increase a degree of freedom in shape of the second light guide section.

A second example of the electronic equipment proposed in the present disclosure includes the light guide member described in (2) and the light-emitting component. Further, the light-emitting component has a plurality of light-emitting elements each of which emits a plurality of colors.

BRIEF DESCRIPTION OF THE DRAWINGS

FIG. 3 is a sectional view obtained by III-III line illustrated in FIG. 1;

DETAILED DESCRIPTION OF THE PREFERRED EMBODIMENT

Figure 1:
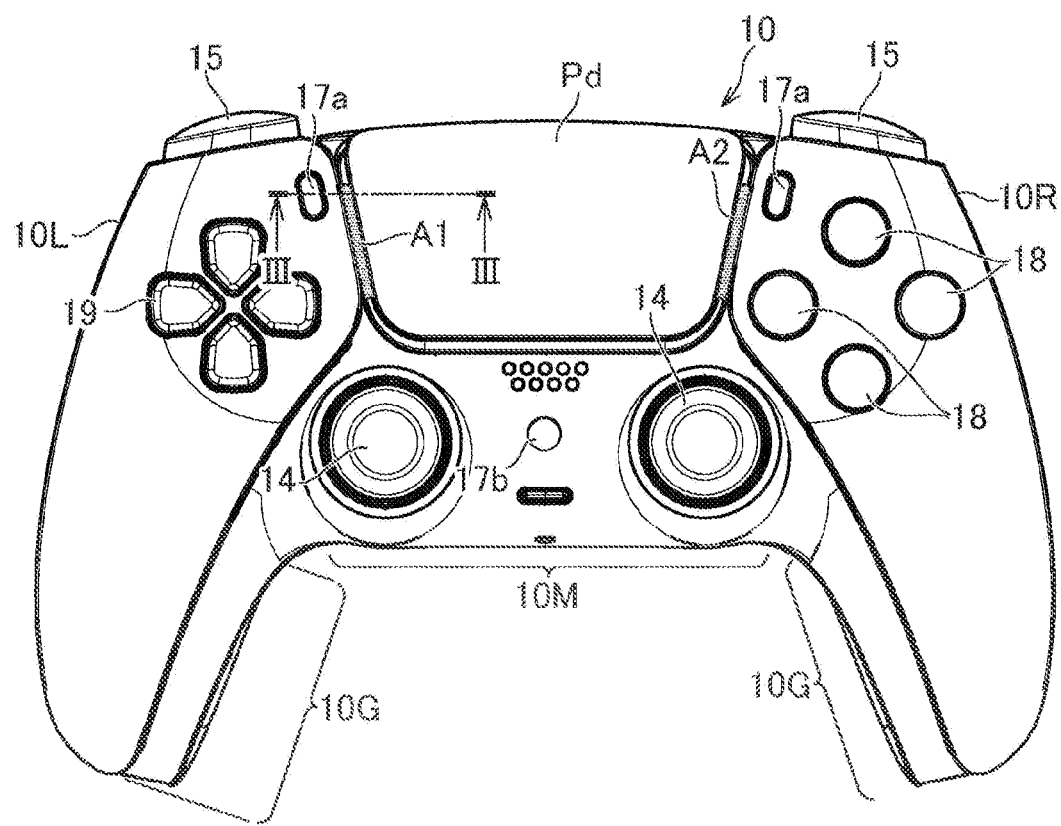
FIG. 1 is a plan view illustrating an input device as an example of electronic equipment proposed in the present disclosure.
Figure 2:
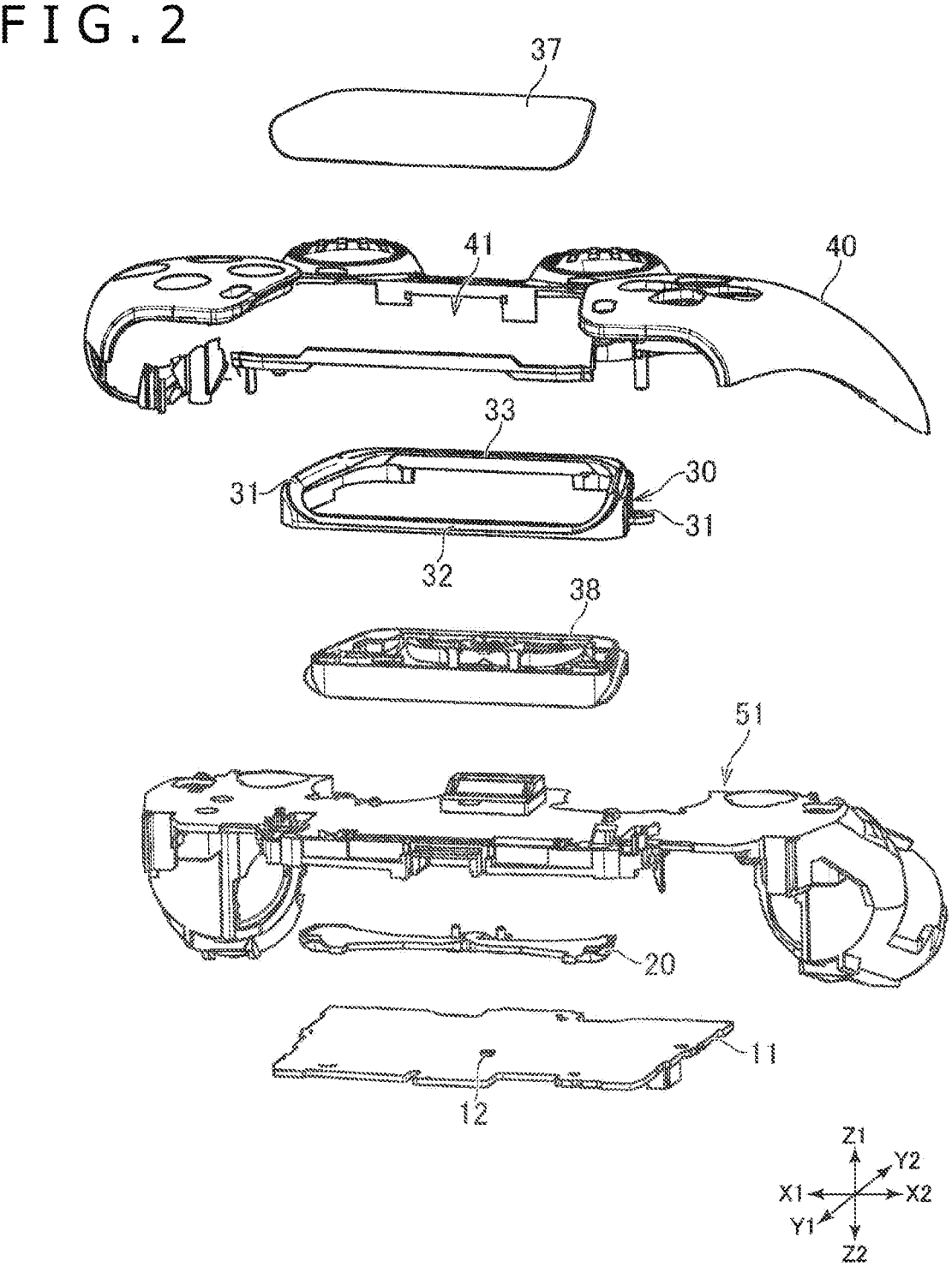
FIG. 2 is an exploded perspective view of the input device illustrated in FIG. 1.

A description will be given below of a light guide member and electronic equipment proposed in the present disclosure, with reference to drawings. FIG. 1 is a plan view of an input device 10 which is an example of electronic equipment proposed in the present disclosure. FIG. 2 is an exploded perspective view of the input device 10. FIG. 3 is a sectional view obtained by III-III line illustrated in FIG. 1. The input device 10 is, for example, an apparatus for inputting user instructions and operations to a gaming apparatus. FIGS. 4 to 8 are diagrams for describing a light guide member 20 included in the input device 10.

In the following description, X1 and X2 illustrated in FIG. 1 are a right direction and a left direction, respectively, Y1 and Y2 illustrated in FIG. 1 are front and back, respectively, and Z1 and Z2 illustrated in FIG. 2 are up and down, respectively. These directions are defined to describe shapes of elements (components, members, and sections) of the input device 10 and a positional relation therebetween and do not limit a posture of the input device 10 during use.

As illustrated in FIG. 1, the input device 10 has, on left and right portions thereof, a left held section 10L and a right held section 10R to be held by a user with hands. The input device 10 has a device center section 10M between the held sections 10L and 10R. The held sections 10L and 10R have grips 10G that extend more backward than a back edge of the device center section 10M. Unlike this, the back edge of the device center section 10M may reach positions of the back edges of the held sections 10L and 10R.

The input device 10 has a plurality of input members for operation performed by the user with fingers. As illustrated in FIG. 1, for example, four input buttons 18 are arranged on an upper surface of a front portion of the right held section 10R, and cross-shaped directional keys (cross buttons) 19 are arranged on an upper surface of a front portion of the left held section 10L. Also, the input device 10 may have left and right input buttons 17a and an input button 17b arranged at the horizontal center of the input device 10. Further, the input device 10 may have input buttons 15 on front surfaces of the held sections 10R and 10L.

As illustrated in FIG. 1, the input device 10 may have input sticks 14. The input sticks 14 are arranged, for example, on a right portion and a left portion of the device center section 10M. The input sticks 14 can be tilted in a radial direction thereof and rotated around a centerline of an initial position in a tilted state. The input sticks 14 may be supported in such a manner as to be able to move up and down and may function as buttons. The input sticks 14 may be radially slidable instead of being tilted in the radial direction.

<Configuration and Functions of Input Pad>

Also, the input device 10 may have an input pad Pd. The input pad Pd is arranged, for example, forward of the left and right input sticks 14 and between the input buttons 18 and the directional keys 19. The input pad Pd has, as illustrated in FIG. 2, an exterior plate 37 included in an upper surface of the input device 10 and a pad frame 38 attached below the exterior plate 37. A touch sensor (not illustrated) for detecting the position of a user's finger that has touched the exterior plate 37 may be attached to a lower surface of the exterior plate 37. Also, the input pad Pd may be supported in such a manner as to be able to move up and down and may function as a pushbutton. A leaf spring section for biasing the input pad Pd upward (i.e., bringing the input pad Pd back to the initial position) may be formed in the pad frame 38.

The input device 10 has a main frame 51. The main frame 51 supports the input pad Pd, the plurality of input buttons 18, 17a, and 17b, the directional keys 19, and the like that are provided thereabove.

The input device 10 has a cabinet that accommodates the main frame 51 and the like. As illustrated in FIG. 2, the input device 10 has an upper cabinet 40 included in an upper portion of the cabinet. The upper cabinet 40 has openings formed therein in which the plurality of input buttons 18, 17a, 17b, and 15, and the directional keys 19 described above are arranged.

Also, the input device 10 has, as illustrated in FIG. 2, a circuit board 11, a light guide member 20, and a light diffusion member 30.

<Outline of Light Guide Member>

A light-emitting component 12 is implemented on an upper surface of the circuit board 11. The light-emitting component 12 may be located, for example, below the horizontal center of the input pad Pd.

Figure 6:
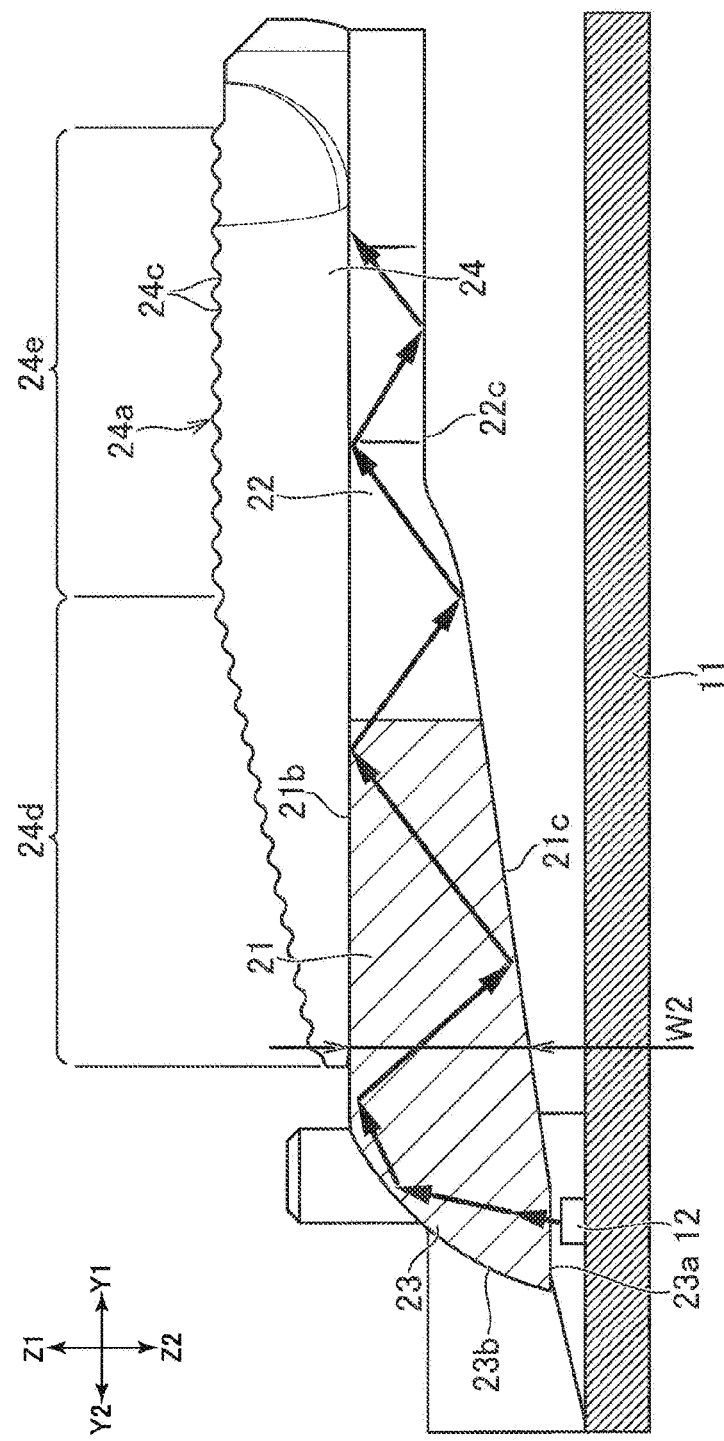
FIG. 6 is a sectional view obtained by VI-VI line illustrated in FIG. 5.

The light guide member 20 has, as illustrated in FIG. 6, a light-receiving section 23 with a light-receiving surface 23a for receiving light from the light-emitting component 12. The light-emitting component 12 is implemented on the circuit board 11 in such a manner as to emit light in the direction orthogonal to the circuit board 11. In the example illustrated in the figure, the light-emitting component 12 is arranged in such a manner as to emit light upward. In consequence, the light-receiving surface 23a is arranged above the light-emitting component 12 and faces downward.

Also, as illustrated in FIG. 6, the light guide member 20 has a first light guide section 21 extending from the light-receiving section 23. The first light guide section 21 extends forward from the light-receiving section 23. The light-receiving section 23 has a reflection surface 23b. The reflection surface 23b is located above the light-receiving surface 23a (in the incident direction of light on the light-receiving surface 23a) and inclined in such a manner as to reflect incident light from the light-receiving surface 23a toward the first light guide section 21.

Figure 4:
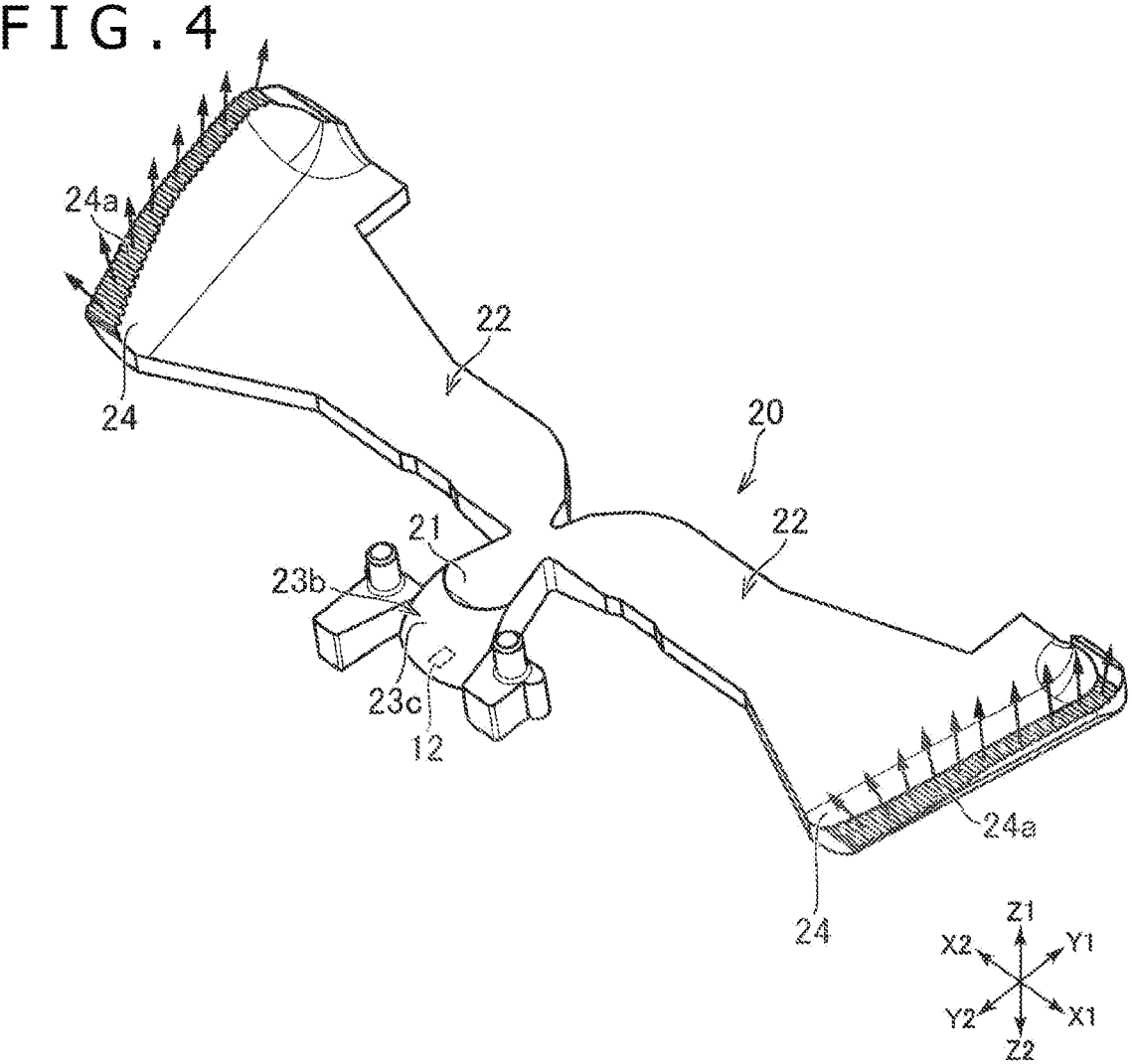
FIG. 4 is a perspective view of a light guide member illustrated in FIG. 1.

As illustrated in FIG. 4, the light guide member 20 has two second light guide sections 22 branching out from the first light guide section 21 and light radiation surfaces 24a. The two second light guide sections 22 extend leftward and rightward from the first light guide section 21, respectively. The light radiation surfaces 24a face upward.

Figure 7:
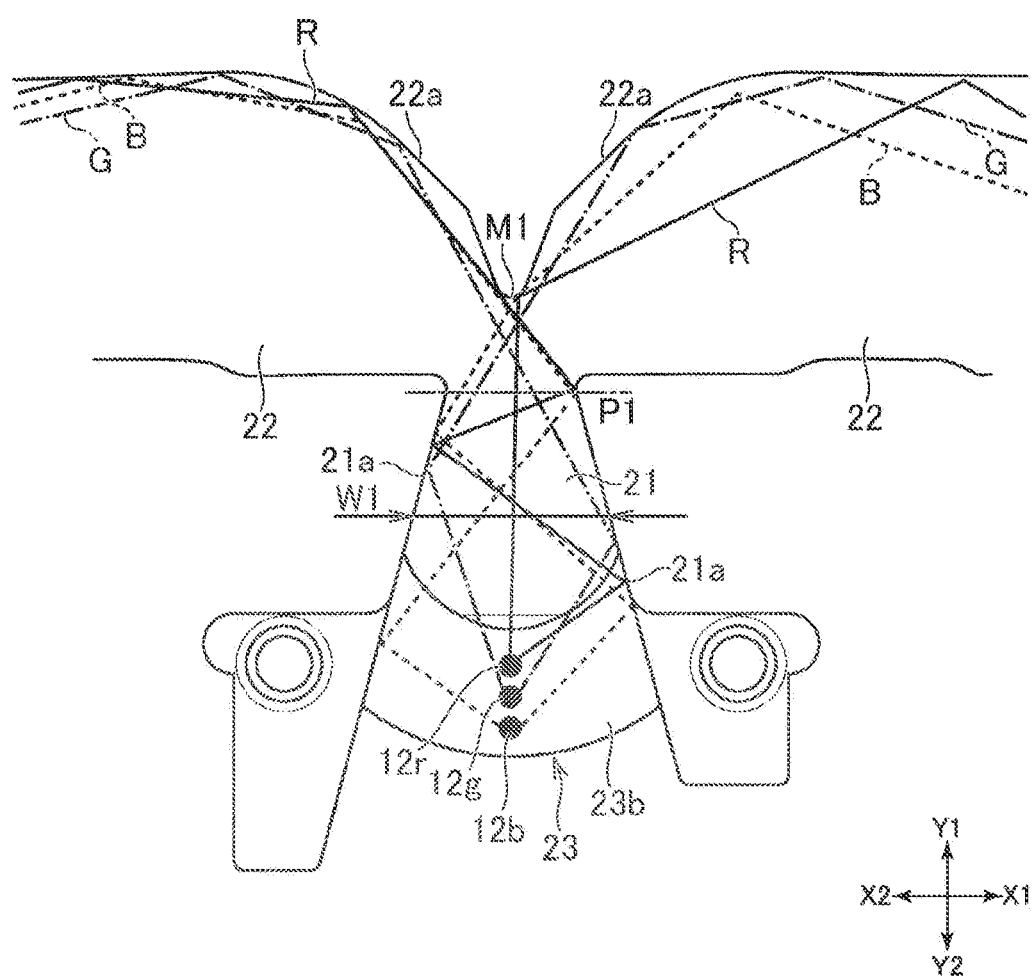
FIG. 7 is a plan view of a center portion of the light guide member.

As illustrated in FIG. 6, light received by the light-receiving surface 23a is guided forward by the first light guide section 21. Then, the light is divided, as illustrated in FIG. 7, into left and right by branching reflection surfaces 22a that are formed at base portions of the two second light guide sections 22, and guided rightward and leftward by the two second light guide sections 22. (In FIG. 7, a solid line R, a long dashed short dashed line G, and a broken line B each illustrate an example of light that travels inside the light guide member 20.) Then, the light is emitted upward from the light radiation surfaces 24a as illustrated by arrows in FIG. 4.

<Light Diffusion Member>

The light diffusion member 30 may be, for example, in the shape of a frame that surrounds the input pad Pd. Further, the light diffusion member 30 has, as illustrated in FIG. 2, left and right side portions 31. The left and right side portions 31 extend in a front-to-back direction along left and right edges of the input pad Pd, respectively. Also, the light diffusion member 30 has a front portion 32 that is arranged on a front side of the input pad Pd and a back portion 33 that is arranged on a back side of the input pad Pd.

As illustrated in FIG. 3, the left and right side portions 31 of the light diffusion member 30 are located above the light radiation surfaces 24a of the light guide member 20. In consequence, light emitted from the light radiation surfaces 24a enters the side portions 31. The light diffusion member 30 includes an optically transparent material having light-reflecting fine particles mixed therein. Light that enters the light diffusion member 30 is irregularly reflected inside the light diffusion member 30 and emitted upward from the side portions 31 of the light diffusion member 30.

As illustrated in FIG. 2, the light guide member 20 is arranged below the main frame 51. The main frame 51 includes a material that does not allow light to pass therethrough. The main frame 51 has openings 51a formed therein at the positions corresponding to the light radiation surfaces 24a. The light radiation surfaces 24a are exposed upward from the openings 51a. This makes it possible for light emitted from the light radiation surfaces 24a to enter the side portions 31 of the light diffusion member 30. Meanwhile, the first light guide section 21 and the second light guide sections 22 are located below the main frame 51.

As illustrated in FIG. 2, the upper cabinet 40 has an opening 41 in which the input pad Pd is arranged. As illustrated in FIG. 3, a gap is formed between the left edge of the input pad Pd (left edge 37a of the exterior plate 37) and a left edge 41a of the opening 41. An upper portion 31a of the side portion 31 on the left side of the light diffusion member 30 is exposed upward from this gap. This forms a light-emitting region A1 (refer to FIG. 1) extending in the front-to-back direction along the left edge of the input pad Pd (left edge 37a of the exterior plate 37). Similarly, a gap is also formed between the right edge of the input pad Pd (right edge of the exterior plate 37) and a right edge of the opening 41. The upper portion 31a of the side portion 31 on the right side of the light diffusion member 30 is exposed upward from this gap. This forms a light-emitting region A2 (refer to FIG. 1) extending in the front-to-back direction along the right edge of the input pad Pd.

It should be noted that the shape of the light diffusion member 30 is not limited to the example illustrated in FIG. 2. For example, the light diffusion member 30 may not be in the shape of a frame that surrounds the input pad Pd. For example, the input device 10 may have a light diffusion member in the shape of a rod located above the left light radiation surface 24a of the light guide member 20 and a light diffusion member in the shape of a rod located above the right light radiation surface 24a of the light guide member 20.

<Light-Emitting Component>

The light-emitting component 12 has a plurality of light-emitting elements each of which emits a plurality of colors. For example, the light-emitting component 12 has, as illustrated in FIG. 7, three light-emitting elements 12r, 12g, and 12b. Each of the light-emitting elements 12r, 12g, and 12b is a light-emitting diode, and these are packaged in the light-emitting component 12 (refer to FIG. 6). Unlike this, each of the light-emitting elements 12r, 12g, and 12b may be packaged. That is, the input device 10 may have a plurality of light-emitting components that include the light-emitting elements 12r, 12g, and 12b, respectively.

There is no possibility that the three light-emitting elements 12r, 12g, and 12b are located at the completely same position, and even if they are packaged in the single light-emitting component 12, they are at small distances from each other. This causes color unevenness in the light-emitting regions A1 and A2 (refer to FIG. 1). That is, because the three light-emitting elements 12r, 12g, and 12b are at different positions, there is a possibility of occurrence of such phenomena (color unevenness) that blue in front portions of the light-emitting regions A1 and A2 becomes darker than that in back portions thereof and red in the back portions becomes darker than that in the front portions. The light guide member 20 and the input device 10 proposed in the present disclosure have the structure described below to reduce this color unevenness.

<First Light Guide Section>

The first light guide section 21 extends in the direction along the circuit board 11 from the position of the light-receiving section 23. Specifically, as described above, the first light guide section 21 extends forward. As illustrated in FIG. 7, a horizontal width W1 of the first light guide section 21 gradually decreases as it approaches the second light guide sections 22. This makes it possible to increase the number of times that light is reflected by left and right side surfaces 21a of the first light guide section 21 for each of light beams emitted from the plurality of light-emitting elements 12r, 12g, and 12b. As a result, light paths of different colors are diversified, which makes it possible to reduce color unevenness in the light radiation surfaces 24a in the front-to-back direction.

As illustrated in FIG. 7, both of the left and right side surfaces 21a may be inclined such that the gap therebetween (width W1) decreases as it progresses forward. The first light guide section 21 may be horizontally symmetrical when seen in plan view.

The shape of the first light guide section 21 is not limited to the example illustrated in FIG. 7 and the like. For example, depending on the shape of the second light guide sections 22 (extension direction of the second light guide sections 22), only one of the left and right side surfaces 21a may be inclined relative to the extension direction (front-to-back direction) of the first light guide section 21.

As illustrated in FIG. 6, a vertical width W2 of the first light guide section 21 may also gradually decrease as it approaches the second light guide section 22. This makes it possible to increase the number of times that light is reflected by an upper surface 21b and a lower surface 21c of the first light guide section 21. As a result, the light paths of different colors are further diversified, which makes it possible to reduce color unevenness in the light radiation surfaces 24a in the front-to-back direction even more effectively.

As illustrated in FIG. 6, the upper surface 21b may be formed along the front-to-back direction. That is, the upper surface 21b may be formed parallel to the circuit board 11. Meanwhile, the lower surface 21c may be inclined in such a manner as to gradually increase in height as it approaches the second light guide section 22. According to this structure, it is possible to secure a gap between a lower surface 22c of the second light guide section 22 extending from the first light guide section 21 and the circuit board 11. Then, the gap can be used to arrange components. For example, it is possible to implement electronic components on the surface of the circuit board 11 on the side of the second light guide section 22.

Thus, in the light guide member 20, the widths W1 and W2 in the two directions (horizontal and vertical directions) orthogonal to the extension direction of the first light guide section 21 decrease as they approach the second light guide section 22. As a result, it is possible to increase the number of times that light is reflected by the external surfaces (the left and right side surfaces 21a, the upper surface 21b, and the lower surface 21c) of the first light guide section 21 for each of the light beams emitted from the plurality of light-emitting elements 12r, 12g, and 12b. As a result, the light paths of different colors are diversified, which makes it possible to reduce color unevenness in the light radiation surfaces 24a in the front-to-back direction.

In the example illustrated in the figure, the light guide member 20 has the two second light guide sections 22 branching out from the first light guide section 21, and the widths W1 and W2 of the first light guide section 21 gradually decrease as they approach the branch point between the two second light guide sections 22. In consequence, it is possible to reduce color unevenness in the front-to-back direction in the two light radiation surfaces 24a each of which emits light guided from the two second light guide sections 22.

Figure 8:
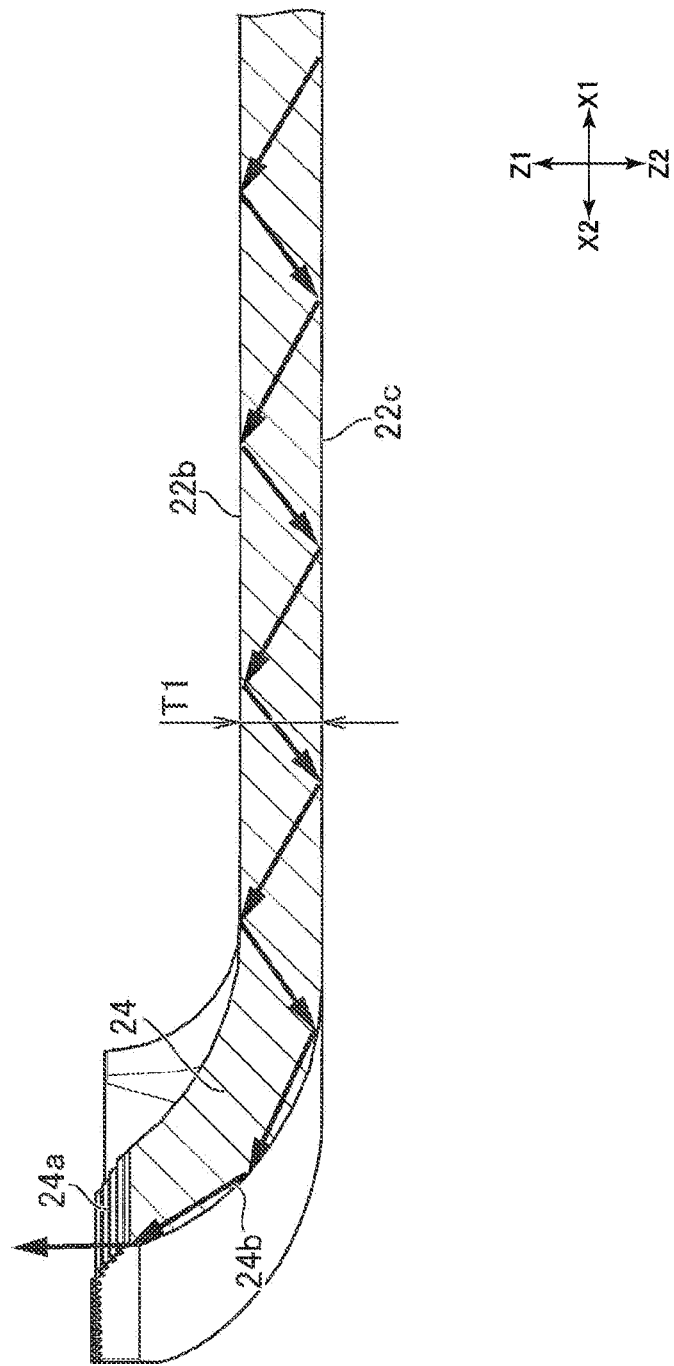
FIG. 8 is a sectional view obtained by VIII-VIII line illustrated in FIG. 5.

Also, a structure for diversifying the light paths is formed in the first light guide section 21 that is located upstream of the branch point between the two second light guide sections 22, which eliminates the need for structures for reducing color unevenness in the second light guide sections 22 and makes it possible to increase the degree of freedom in shape of the second light guide sections 22. For example, as illustrated in FIG. 8, it is possible to substantially make uniform a thickness T1 (vertical width) of the second light guide sections 22 in the extension direction thereof. This makes it possible to reduce light that passes through upper surfaces 22b and the lower surfaces 22c of the second light guide sections 22 and leaks externally without reaching the light radiation surfaces 24a.

Owing to such a shape of the first light guide section 21, a cross-sectional area of the first light guide section 21 becomes smallest at a frontmost portion thereof (position P1 illustrated by a long dashed double-short dashed line in FIG. 7). The cross-sectional area (Sb) of each of the second light guide sections 22 is larger than the cross-sectional area (Sa) of the first light guide section 21 at the position P1 (Sb>Sa). (Here, the cross-sectional area of the first light guide section 21 is the area on a cutting surface that is orthogonal to the extension direction of the first light guide section 21. Further, the cross-sectional area of each of the second light guide sections 22 is the area on a plane that is orthogonal to the extension direction of each of the second light guide sections 22.) According to this, it is possible to emit light from a wide extent of the light-emitting regions A1 and A2 while, at the same time, reducing color unevenness in the light-emitting regions A1 and A2.

It should be noted that, unlike the example illustrated in FIGS. 6 and 7, only one of the horizontal width W1 (FIG. 7) and the vertical width W2 (FIG. 6) of the first light guide section 21 may decrease as it approaches the second light guide section 22.

As described above, the light-receiving section 23 has the reflection surface 23b (refer to FIG. 6) for reflecting light toward the first light guide section 21. Owing to the presence of the reflection surface 23b, it is possible to further increase the number of times of reflection in the first light guide section 21. As a result, it is possible to effectively reduce color unevenness in the light-emitting regions A1 and A2.

Also, the reflection surface 23b is bent such that right and left portions thereof are located more forward than a horizontal center 23c (refer to FIG. 4). Owing to this shape of the reflection surface 23b, it is possible to further increase the number of times of reflection in the first light guide section 21. As a result, it is possible to effectively reduce color unevenness in the light-emitting regions A1 and A2.

<Arrangement of Light-Emitting Elements>

The plurality of light-emitting elements 12r, 12g, and 12b are arranged side by side in the direction orthogonal to the extension direction (rightward and leftward) of the two second light guide sections 22 branching out from the first light guide section 21. In the input device 10, as illustrated in FIG. 7, the light-emitting elements 12r, 12g, and 12b are arranged side by side in the front-to-back direction. Owing to this arrangement of the light-emitting elements 12r, 12g, and 12b, the paths of light emitted from the light-emitting elements 12r, 12g, and 12b become horizontally symmetrical. As a result, it is possible to reduce a difference between the color of light emitted by the light-emitting region A1 on the left side and the color of light emitted by the light-emitting region A2 on the right side.

<Second Light Guide Sections>

As illustrated in FIG. 7, each of the left and right second light guide sections 22 has the two branching reflection surfaces 22a at a base portion thereof. The two branching reflection surfaces 22a are located in the extension direction (i.e., forward) of the first light guide section 21 relative to the first light guide section 21. The branching reflection surface 22a on the left side is inclined in the front-to-back direction in such a manner as to reflect light toward the left second light guide section 22. Conversely, the branching reflection surface 22a on the right side is inclined in the front-to-back direction so as to reflect light toward the right second light guide section 22.

A center M1 of the left and right branching reflection surfaces 22a may be located on a straight line passing through the plurality of light-emitting elements 12r, 12g, and 12b. This makes it possible to more effectively reduce the difference between the color of light emitted by the light-emitting region A1 on the left side and the color of light emitted by the light-emitting region A2 on the right side.

Figure 5:
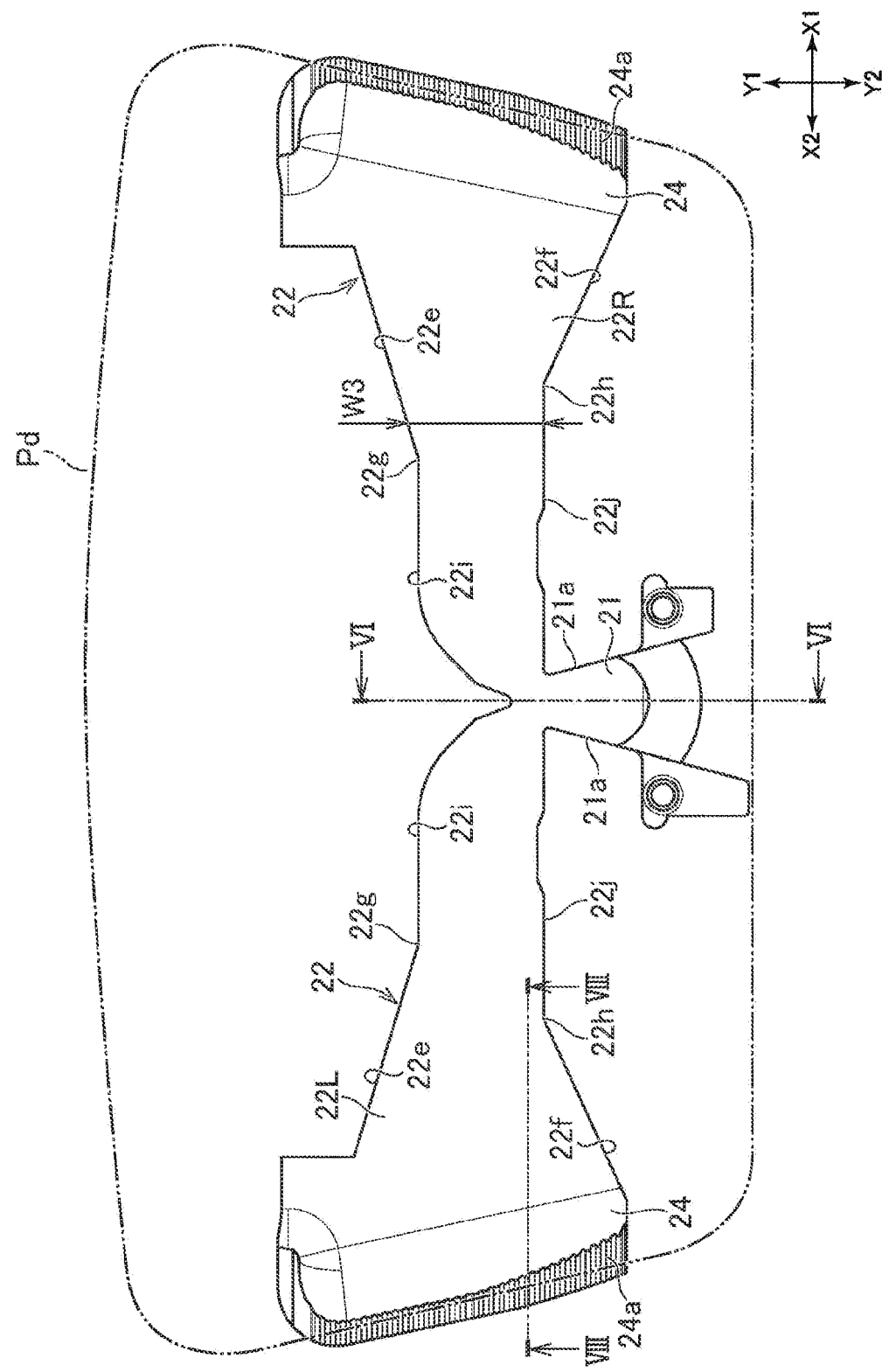
FIG. 5 is a plan view of the light guide member.

In FIG. 5, a width W3 is given to a size of the second light guide sections 22 in the direction (front-to-back direction in the example illustrated in the figure) orthogonal to the extension direction (horizontal direction) of the left and right second light guide sections 22. The second light guide sections 22 have portions in which the width W3 gradually increases as it approaches the light radiation surfaces 24a. In the example illustrated in FIG. 5, the width W3 gradually increases as it progresses toward the light radiation surface 24a in a left portion 22L of the second light guide section 22 on the left side. In addition, the width W3 also gradually increases as it progresses toward the light radiation surface 24a in a right portion 22R of the second light guide section 22 on the right side. Owing to this shape of the second light guide sections 22, the sizes of the light radiation surfaces 24a are secured in the front-to-back direction, which makes it possible to emit light from a wide extent of the light-emitting regions A1 and A2. As a result, it is possible to effectively present, to the user, information such as a game status from applications.

As illustrated in FIG. 5, the second light guide sections 22 have inclined surfaces 22e on the front side thereof and inclined surfaces 22f on the back side thereof. The inclined surfaces 22e on the front side and the inclined surfaces 22f on the back side are inclined relative to the extension direction (horizontal direction in the example illustrated in the figure) of the second light guide sections 22 such that the width W3 gradually increases as it approaches the light radiation surfaces 24a.

The positions of start points 22g of the inclined surfaces 22e on the front side and the positions of start points 22h of the inclined surfaces 22f on the back side may deviate horizontally. This makes it possible to adjust, in the front-to-back direction, amounts of light emitted from the light radiation surfaces 24a. For example, it is possible to make a difference between the amount of light emitted from the front portions of the light radiation surfaces 24a and the amount of light emitted from the back portions of the light radiation surfaces 24a. As a result, it is possible to light up a more effective position (position easy to be seen by the user). It should be noted that the start points 22g are boundaries between the inclined surfaces 22e on the front side and front surfaces 22i of the base portions of the second light guide sections 22. The start points 22h are boundaries between the inclined surfaces 22f on the back side and back surfaces 22j of the base portions of the second light guide sections 22.

As illustrated in FIG. 5, for example, the positions of the start points 22g of the inclined surfaces 22e on the front side may be located closer to the horizontal center (closer to the first light guide section 21) than the positions of the start points 22h of the inclined surfaces 22f on the back side. In other words, the positions of the start points 22g of the inclined surfaces 22e on the front side may be farther from the light radiation surfaces 24a than the positions of the start points 22h of the inclined surfaces 22f on the back side. According to this shape of the second light guide sections 22, it is possible to increase the amounts of light emitted from the front portions of the light radiation surfaces 24a. Unlike the example illustrated in the figure, the second light guide sections 22 may have inclined surfaces only on one of the front side and the back side.

<Bent Portions and Light Radiation Surfaces>

As illustrated in FIG. 8, the light guide member 20 may have bent portions 24 on end portions of the second light guide sections 22. The bent portions 24 are bent upward from the second light guide sections 22. Upper surfaces of the bent portions 24 function as the light radiation surfaces 24a. The bent portions 24 have bent surfaces 24b that continue from the lower surfaces 22c of the second light guide sections 22. Light that travels inside the second light guide sections 22 is reflected by the bent surfaces 24b and directed upward. According to this structure, for example, it is possible to direct light upward without arranging reflectors along the lower surfaces 22c of the second light guide sections 22.

As illustrated in FIG. 6, projections and depressions may be formed on the light radiation surfaces 24a. This makes it possible to spread light emitted from the light radiation surfaces 24a. In the example illustrated in the figure, a plurality of grooves 24c that extend horizontally are formed on the light radiation surfaces 24a. The plurality of grooves 24c are arranged side by side in the front-to-back direction. The projection is provided between each pair of the adjacent grooves 24c. According to this shape of the light radiation surfaces 24a, it is possible to spread light emitted from the light radiation surfaces 24a forward and backward.

Heights of the light radiation surfaces 24a may change in the front-to-back direction. As a result, it is possible to change the distance in the front-to-back direction between the light radiation surface 24a on the right side and the right side portion 31 of the light diffusion member 30. Similarly, it is possible to change the distance in the front-to-back direction between the light radiation surface 24a on the left side and the left side portion 31 of the light diffusion member 30. This makes it possible to adjust luminance of the light-emitting regions A1 and A2 in the front-to-back direction. As a result, it is possible to light up a more effective position for the user.

For example, as illustrated in FIG. 6, the heights of back portions 24d of the light radiation surfaces 24a may be lower than those of front portions 24e. Specifically, the back portions 24d of the light radiation surfaces 24a may be inclined such that the heights thereof become lower than those of the front portions 24e. According to this, it is possible to make the luminance of the front portions of the light-emitting regions A1 and A2 higher than the luminance of the back portions.

<Conclusion>

As described above, the light guide member 20 has the light-receiving section 23 with the light-receiving surface 23a for receiving light of the light-emitting component 12, the first light guide section 21 extending forward from the light-receiving section 23, the second light guide sections 22 each of which extends leftward or rightward from the first light guide section 21, and the light radiation surfaces 24a for externally emitting light guided by the second light guide sections 22. The horizontal width W1 of the first light guide section 21 and the vertical width W2 of the first light guide section 21 gradually decrease as they approach the second light guide section 22. According to this, it is possible to increase the numbers of times that light is reflected by the left and right side surfaces 21a, the upper surface 21b, and the lower surface 21c of the first light guide section 21 for each of the light beams emitted from the plurality of light-emitting elements 12r, 12g, and 12b. As a result, the light paths of different colors are diversified, which makes it possible to reduce color unevenness in the light radiation surfaces 24a in the front-to-back direction. Also, the light paths are diversified in the first light guide section 21, which makes it possible to eliminate or reduce structures for reducing color unevenness in the second light guide sections 22. As a result, it is possible to increase the degree of freedom in shape of the second light guide sections 22.

Also, the light guide member 20 has the two second light guide sections 22 branching out from the first light guide section 21, and the horizontal width W1 of the first light guide section 21 decreases as it approaches the branch point between the second light guide sections 22. According to this shape of the light guide member 20, it is possible to reduce color unevenness in the front-to-back direction in the light radiation surfaces 24a that receive light from the two second light guide sections 22. Also, it is possible to diversify the light paths in the first light guide section 21 that is located upstream of the branch point between the two second light guide sections 22, which makes it possible to eliminate or reduce structures for reducing color unevenness in the second light guide sections 22 and increase the degree of freedom in shape of the second light guide sections 22.

Thus, according to the shape of the light guide member 20, it is possible to increase the degree of freedom in shape of the second light guide sections 22, which makes it possible, for example, to substantially make uniform the thickness T1 (vertical width) of the second light guide sections 22 in the extension direction thereof, as illustrated in FIG. 8. This makes it possible to reduce light that passes through the upper surfaces 22b and the lower surfaces 22c of the second light guide sections 22 and leaks externally without reaching the light radiation surfaces 24a. It should be noted that, in this structure, only one of the horizontal width W1 (FIG. 7) and the vertical width W2 (FIG. 6) of the first light guide section 21 may decrease as it approaches the second light guide section 22. Also, the thickness T1 (vertical width) of the second light guide sections 22 may gradually decrease as it approaches the light radiation surfaces 24a.

Modification Example

It should be noted that the light guide member proposed in the present disclosure is not limited to the above light guide member 20.

For example, the light guide member may not necessarily have the two second light guide sections 22 branching out from the first light guide section 21. That is, the number of second light guide sections 22 branching out from the first light guide section 21 may be one. Even in this case, the horizontal width W1 (FIG. 7) and the vertical width W2 (FIG. 6) of the first light guide section 21 may decrease as they approach the second light guide section 22.

Even in this structure, it is possible to increase the number of times that light is reflected by the left and right side surfaces 21a, the upper surface 21b, and the lower surface 21c of the first light guide section 21 for each of the light beams emitted from the plurality of light-emitting elements 12r, 12g, and 12b. As a result, the light paths of different colors are diversified, which makes it possible to reduce color unevenness in the light radiation surfaces 24a in the front-to-back direction. In this structure, the extension direction of the second light guide sections 22 may be the same as that of the first light guide section 21.

Even in the structure that does not have the two second light guide sections 22 (structure that has the one second light guide section 22), the cross-sectional area of the second light guide section 22 may be larger than the cross-sectional area of the first light guide section 21 at the end portion thereof. This makes it possible to light up a wide extent of the light-emitting regions while, at the same time, reducing color unevenness in the light-emitting regions. It should be noted that the cross-sectional area of the second light guide sections 22 in the description given here is the cross-sectional area of the second light guide sections 22 on planes orthogonal to the extension direction and that the cross-sectional area of the first light guide section 21 is also the cross-sectional area of the first light guide section 21 on a plane orthogonal to the extension direction.

As illustrated in FIG. 5 and the like, in the light guide member 20, the second light guide sections 22 extend in the direction orthogonal to the first light guide section 21, i.e., rightward and leftward, respectively. Unlike this, the second light guide sections 22 may extend in the direction inclined relative to the first light guide section 21, such as the direction inclined to both the front-to-back direction and the horizontal direction.

Also, the above light guide member 20 is the member for lighting up the light-emitting regions A1 and A2 provided along the left and right edges of the input pad Pd. However, the use of the structure of the light guide member proposed in the present disclosure is not limited to this. The structure of the light guide member proposed in the present disclosure may be used to light up other light-emitting regions provided on an external surface of electronic equipment.

Also, in the present disclosure, the input device 10 is described as an example of electronic equipment. However, the structure of the light guide member 20 proposed in the present disclosure may be applied to other electronic equipment such as a gaming apparatus, a personal computer, and a portable terminal.

It should be understood by those skilled in the art that various modifications, combinations, sub-combinations and alterations may occur depending on design requirements and other factors insofar as they are within the scope of the appended claims or the equivalents thereof

What is claimed is:
1. A light guide member comprising:
 a light-receiving section having a light-receiving surface for receiving light of a light-emitting component;
 a first light guide section extending in a first extension direction from the light-receiving section;
 two second light guide sections branching out from the first light guide section; and
 two light radiation surfaces for externally emitting light guided by the two second light guide sections, wherein
 the first light guide section has a first width in a first width direction that is orthogonal to the first extension direction, and
 the first width gradually decreases as it approaches a branch point between the two second light guide sections.

2. The light guide member according to claim 1, wherein
 the first light guide section has a second width in a second width direction that is orthogonal to the first extension direction and the first width direction, and
 the first width and the second width gradually decrease as they approach the branch point between the two second light guide sections.

3. The light guide member according to claim 1, wherein
 the first light guide section has a first cutting surface that is orthogonal to the first extension direction, at a position in the first extension direction where the first width becomes smallest, and
 a cross-sectional area of the second light guide section on a plane that is orthogonal to the extension direction of the second light guide section is larger than an area of the first cutting surface.

4. The light guide member according to claim 1, wherein
 the two second light guide sections have a third width in a third width direction that is orthogonal to the extension direction of the two second light guide sections, and
 the third width increases as it approaches the light radiation surfaces.

5. A light guide member comprising:
 a light-receiving section having a light-receiving surface for receiving light of a light-emitting component;
 a first light guide section extending in a first extension direction from the light-receiving section;
 a second light guide section extending in a second extension direction from the first light guide section; and
 a light radiation surface for externally emitting light guided by the second light guide section, wherein
 the first light guide section has a first width in a first width direction that is orthogonal to the first extension direction and a second width in a second width direction that is orthogonal to the first extension direction and the first width direction, and
 the first width and the second width gradually decrease as they approach the second light guide section.

6. The light guide member according to claim 5, wherein
 the first light guide section has a first cutting surface that is orthogonal to the first extension direction, at a position where the first width and the second width become smallest, and
 a cross-sectional area of the second light guide section on a plane that is orthogonal to the extension direction of the second light guide section is larger than an area of the first cutting surface.

7. The light guide member according to claim 5, comprising: two light guide sections branching out from the first light guide section as the second light guide section.

8. The light guide member according to claim 1, wherein
 the light-receiving surface is oriented in a direction that is orthogonal to the first extension direction, and
 the light-receiving section further has a reflection surface that reflects light received by the light-receiving surface toward the first light guide section.

9. The light guide member according to claim 5, wherein
the light-receiving surface is oriented in a direction that is orthogonal to the first extension direction, and the light-receiving section further has a reflection surface that reflects light received by the light-receiving surface toward the first light guide section.

10. The light guide member according to claim 1, wherein projections and depressions are formed on the light radiation surfaces.

11. The light guide member according to claim 5, wherein projections and depressions are formed on the light radiation surface.

12. Electronic equipment comprising:
a light guide member including
a light-receiving section having a light-receiving surface for receiving light of a light-emitting component,
a first light guide section extending in a first extension direction from the light-receiving section,
two second light guide sections branching out from the first light guide section, and
two light radiation surfaces for externally emitting light guided by the two second light guide sections,
the first light guide section having a first width in a first width direction that is orthogonal to the first extension direction, and
the first width gradually decreasing as it approaches a branch point between the two second light guide sections; and
the light-emitting component,
wherein the light-emitting component has a plurality of light-emitting elements each of which emits a plurality of colors.

13. The electronic equipment according to claim 12, wherein the plurality of light-emitting elements are arranged side by side in a direction that is orthogonal to a direction in which the two second light guide sections extend.

14. Electronic equipment comprising:
a light guide member including
a light-receiving section having a light-receiving surface for receiving light of a light-emitting component,
a first light guide section extending in a first extension direction from the light-receiving section,
a second light guide section extending in a second extension direction from the first light guide section, and
a light radiation surface for externally emitting light guided by the second light guide section,
the first light guide section having a first width in a first width direction that is orthogonal to the first extension direction and a second width in a second width direction that is orthogonal to the first extension direction and the first width direction, and
the first width and the second width gradually decreasing as they approach the second light guide section; and
the light-emitting component,
wherein the light-emitting component has a plurality of light-emitting elements each of which emits a plurality of colors.

15. The electronic equipment according to claim 14, wherein the plurality of light-emitting elements are arranged side by side in the first extension direction.

\* \* \* \* \*